(12) United States Patent
Lee et al.

(10) Patent No.: US 8,413,125 B2
(45) Date of Patent: Apr. 2, 2013

(54) ASYNCHRONOUS DYNAMIC COMPILATION BASED ON MULTI-SESSION PROFILING TO PRODUCE SHARED NATIVE CODE

(75) Inventors: Robert H. Lee, Sunnyvale, CA (US); David Unietis, San Francisco, CA (US); Mark Jungerman, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1530 days.

(21) Appl. No.: 11/698,629

(22) Filed: Jan. 26, 2007

(65) Prior Publication Data

US 2008/0184210 A1     Jul. 31, 2008

(51) Int. Cl.
    *G06F 9/45*     (2006.01)
(52) U.S. Cl. ......... 717/148; 717/139; 717/140; 717/146
(58) Field of Classification Search .................. 717/139, 717/148
    See application file for complete search history.

(56) References Cited

U.S. PATENT DOCUMENTS

| | | | |
|---|---|---|---|
| 4,588,985 A | 5/1986 | Carter et al. | |
| 5,051,893 A | 9/1991 | Tenny et al. | |
| 5,301,327 A | 4/1994 | McKeeman et al. | |
| 5,325,531 A | 6/1994 | McKeeman et al. | |
| 5,504,885 A | 4/1996 | Alashqur | |
| 5,539,899 A | 7/1996 | Huynh et al. | |
| 5,696,927 A | 12/1997 | MacDonald et al. | |
| 5,768,593 A | 6/1998 | Walters et al. | |
| 5,887,174 A | 3/1999 | Simons et al. | |
| 5,966,536 A | 10/1999 | Ravichandran | |
| 6,139,199 A | 10/2000 | Rodriguez | |
| 6,205,440 B1 | 3/2001 | Nusbickel | |
| 6,263,429 B1 | 7/2001 | Siska | |
| 6,292,934 B1 | 9/2001 | Davidson et al. | |
| 6,381,740 B1 | 4/2002 | Miller et al. | |
| 6,434,685 B1 | 8/2002 | Sexton et al. | |
| 6,484,313 B1 | 11/2002 | Trowbridge et al. | |
| 6,519,594 B1 * | 2/2003 | Li | 719/312 |
| 6,591,355 B2 | 7/2003 | Schuster et al. | |
| 6,782,532 B1 | 8/2004 | Sexton et al. | |
| 6,829,761 B1 | 12/2004 | Sexton et al. | |
| 6,854,114 B1 | 2/2005 | Sexton et al. | |
| 6,910,213 B1 * | 6/2005 | Hirono et al. | 718/108 |

(Continued)

OTHER PUBLICATIONS

U.S. Appl. No. 11/698,638.

(Continued)

*Primary Examiner* — Wei Zhen
*Assistant Examiner* — Matthew Brophy
(74) *Attorney, Agent, or Firm* — Silicon Valley Patent Group LLP; Omkar Suryadevara (57) ABSTRACT

A computer is programmed to automatically have multiple sessions update a common counter which is shared therebetween, when interpreting a given method so that system-wide statistics are collected for each method. The single counter is commonly accessed for updating by the respective interpreters in the multiple sessions which are executing the method. The computer is further programmed to asynchronously compile the method (regardless of the state of the multiple sessions), to obtain compiled software in the form of executable machine instructions. Specifically, asynchronous compilation starts dynamically, whenever a method's common multi-session counter satisfies a predetermined condition. Finally, each session is informed when compilation is completed so that the next time the method needs to be run, it is not interpreted and instead the compiled software is executed. The compiled software is kept in a shared memory which is accessible to each session.

20 Claims, 6 Drawing Sheets

U.S. PATENT DOCUMENTS

| | | | |
|---|---|---|---|
| 6,973,646 | B1 | 12/2005 | Bordawekar et al. |
| 7,032,216 | B1 | 4/2006 | Nizhegorodov |
| 7,035,870 | B2 * | 4/2006 | McGuire et al. ............... 707/704 |
| 7,181,736 | B2 | 2/2007 | Douceur et al. |
| 7,617,496 | B2 | 11/2009 | Gonion |
| 7,788,314 | B2 * | 8/2010 | Holt .............................. 709/201 |
| 7,958,176 | B2 | 6/2011 | Douceur et al. |
| 2001/0047436 | A1 | 11/2001 | Sexton et al. |
| 2002/0029357 | A1 * | 3/2002 | Charnell et al. .................. 714/9 |
| 2002/0112226 | A1 | 8/2002 | Brodersen et al. |
| 2002/0144240 | A1 | 10/2002 | Lueh et al. |
| 2003/0005419 | A1 | 1/2003 | Pieper et al. |
| 2003/0093778 | A1 | 5/2003 | Bak et al. |
| 2003/0159134 | A1 | 8/2003 | Souloglou et al. |
| 2004/0003380 | A1 | 1/2004 | Fedorov |
| 2004/0019886 | A1 * | 1/2004 | Berent et al. .................. 717/158 |
| 2004/0031022 | A1 | 2/2004 | Kabasawa et al. |
| 2004/0044995 | A1 * | 3/2004 | Hickson ........................ 717/148 |
| 2004/0054994 | A1 | 3/2004 | Demsey et al. |
| 2004/0168028 | A1 * | 8/2004 | Cierniak ........................ 711/125 |
| 2004/0168162 | A1 | 8/2004 | Park et al. |
| 2004/0210865 | A1 * | 10/2004 | Shimura ........................ 717/100 |
| 2004/0230958 | A1 | 11/2004 | Alaluf |
| 2004/0243989 | A1 | 12/2004 | Owens et al. |
| 2006/0048114 | A1 | 3/2006 | Schmidt |
| 2006/0070051 | A1 * | 3/2006 | Kuck et al. .................... 717/162 |
| 2006/0206884 | A1 * | 9/2006 | Creamer et al. ............... 717/147 |
| 2006/0247908 | A1 | 11/2006 | Douceur et al. |
| 2007/0006178 | A1 * | 1/2007 | Tan ............................... 717/136 |
| 2007/0006189 | A1 | 1/2007 | Li et al. |
| 2007/0061787 | A1 | 3/2007 | Trowbridge |
| 2007/0204258 | A1 * | 8/2007 | Chung .......................... 717/118 |
| 2008/0034355 | A1 | 2/2008 | Shen et al. |
| 2009/0055603 | A1 * | 2/2009 | Holt .............................. 711/154 |

OTHER PUBLICATIONS

U.S. Appl. No. 11/698,634.
Non-Final Rejection dated Nov. 9, 2010 in U.S. Appl. No. 11/698,634, 15 pages.
Applicant-Initiated Interview Summary dated Mar. 30, 2012 in U.S. Appl. No. 11/698,638, pp. 4.
Amendment filed with RCE dated Apr. 15, 2012 in U.S. Appl. No. 11/698,638, pp. 9.
Amendment dated Mar. 9, 2011 as filed in U.S. Appl. No. 11/698,634 including: Amendment/Req. Reconsideration—After Non-Final Reject (1 page), Specification (3 pages), Claims (4 pages) and Applicant Arguments/ Remarks (11 pages).
Oracle® Database, Java Developer's Guide, 10g Release 1 (10.1), Part No. B12021-02, Jun. 2004, 218 pages.
Dmitriev, M. "Towards Flexible and Safe Technology for Runtime Evolution of Java Language Applications", In Proceedings of the Workshop on Engineering Complex Object-Oriented Systems for Evolution, in association with OOPSLA 2001 International Conference, 8 pages.
Developing Stored Procedures in Java™, An Oracle Technical White Paper, Apr. 1999, 19 pages.
Oracle8i, Java Stored Procedures Developer's Guide, Release 2 (8.1.6), Part No. A81358-01, Dec. 1999, 122 pages.
Response dated May 14, 2011 as filed in U.S. Appl. No. 11/698,638 (1 page).
Office Action dated May 5, 2011 in U.S. Appl. No. 11/698,638 (1 page).
Notice of Allowance dated Jun. 2, 2011 in U.S. Appl. No. 11/698,634 (19 pages).
Office Action dated Apr. 19, 2011 in U.S. Appl. No. 11/698,638, (7 pages).
Examiner's Interview Summary dated May 4, 2011 in U.S. Appl. No. 11/698,638, (5 pages).
"Enhancing Source-Level Programming Tools With an Awareness of Transparent Program Transformations", Myoungdyu Song et al., Oct. 2009, pp. 301-319.
"Anatomy of a Native XML Base Management System", Thorsten Fiebig et al., 2002, pp. 1-23.
"Integrating Programming Languages & Databases: What's the Problem", William R. Cook et al., 2005, pp. 1-18.
"Orthogonal Persistence as an Implementation Platform for Software Development Environments", G.N.C. Kirby et al., 1997, pp. 1-12.
Notice of Allowance dated Sep. 7, 2012 in U.S. Appl. No. 11/698,638, 8 pages.
Scott McFarling "Program Optimization for Instruction Caches", [Online], 1989, pp. 183-191, [Retrieved from Internet on Sep. 1, 2012], http://citeseerx.ist.psu.edu/viewdoc/download?doi=1_0.1.1.1_03.538&rep=repl&type=pdf.
Stefan Steinke et al., "Assigning Program and Data Objects to Scratchpad for Energy Reduction", [Online], 2002, pp. 1-7, [Retrieved from Internet on Sep. 1, 2012], http://www.date-conference.com/archive/conference/proceedings/PAPERS/2002/DATE02/PDFFILES/04E_3.pdf.
Chris H. Perleberg, "Branch Target Buffer Design", [Online], 1989, pp. 1-61, [Retrieved from Internet on Sep. 1, 2012], http://www.eecs.berkeley.edu/Pubs/TechRpts/1989/CSD-89-553.pdf.
Office Action dated Jul. 28, 2011 in U.S. Appl. No. 11/698,638, pp. 31.
Amendment dated Nov. 28, 2011 in U.S. Appl. No. 11/698,638, pp. 12.
Notice of Allowance dated Feb. 2, 2012 in U.S. Appl. No. 11/698,638, pp. 9.
Greg Wright et al. "An object-aware memory architecture", 2005, pp. 1-34.
Udo W. Pooch "A Dynamic Clustering Strategy in a Demand Paging Environment", 1976, pp. 1-13.
Andhi Janapsatya et al. "A Novel Instruction Scratchpad Memory Optimization Method based on Concomitance Metric", 2006, pp. 612-617.
Joseph P. Moran, SunOS Virtual Memory Implementation, 1988, pp. 1-17.
Applicant's Interview Summary dated Sep. 2, 2011 in U.S. Appl. No. 11/698,634, p. 1.

* cited by examiner

ASYNCHRONOUS DYNAMIC COMPILATION BASED ON MULTI-SESSION PROFILING TO PRODUCE SHARED NATIVE CODE

CROSS-REFERENCE TO RELATED APPLICATIONS

This application is related to and incorporates by reference herein in its entirety, the commonly-owned U.S. application Ser. No. 11/698,638, filed on Jan. 26, 2007, entitled "CODE GENERATION IN THE PRESENCE OF PAGED MEMORY" by Robert H. Lee et al.

This application is also related to and incorporates by reference herein in its entirety, the commonly-owned U.S. application Ser. No. 11/698,634, filed on Jan. 26, 2007, entitled "CODE PERSISTENCE AND DEPENDENCY MANAGEMENT FOR DYNAMIC COMPILATION IN A DATABASE MANAGEMENT SYSTEM" by Robert H. Lee et al.

BACKGROUND

Some prior art systems compile bytecodes of a computer program expressed in the Java programming language into native executable code (i.e. machine instructions) in an ahead of time (AOT) manner. Native code that is compiled ahead of time is typically frozen, which enables it to be shared among multiple users (as illustrated by the sharing of Java Class X in FIG. 1), but it has the drawback that the frozen code cannot be easily updated.

Another technology that is employed by several Java Virtual Machines (JVMs) to allow updates to Java code is dynamic compilation, which is also called Just-in-Time (JIT) compilation. In JIT compilation, Java bytecodes are compiled into native machine code, only on demand as and when needed (instead of compilation ahead-of-time). Specifically, bytecodes are interpreted by a JVM initially, until they are found to be heavily used, at which time they are compiled by the JIT compiler. The compiled code is typically discarded by the prior art systems known to the current inventors, when execution terminates.

Figure 1:
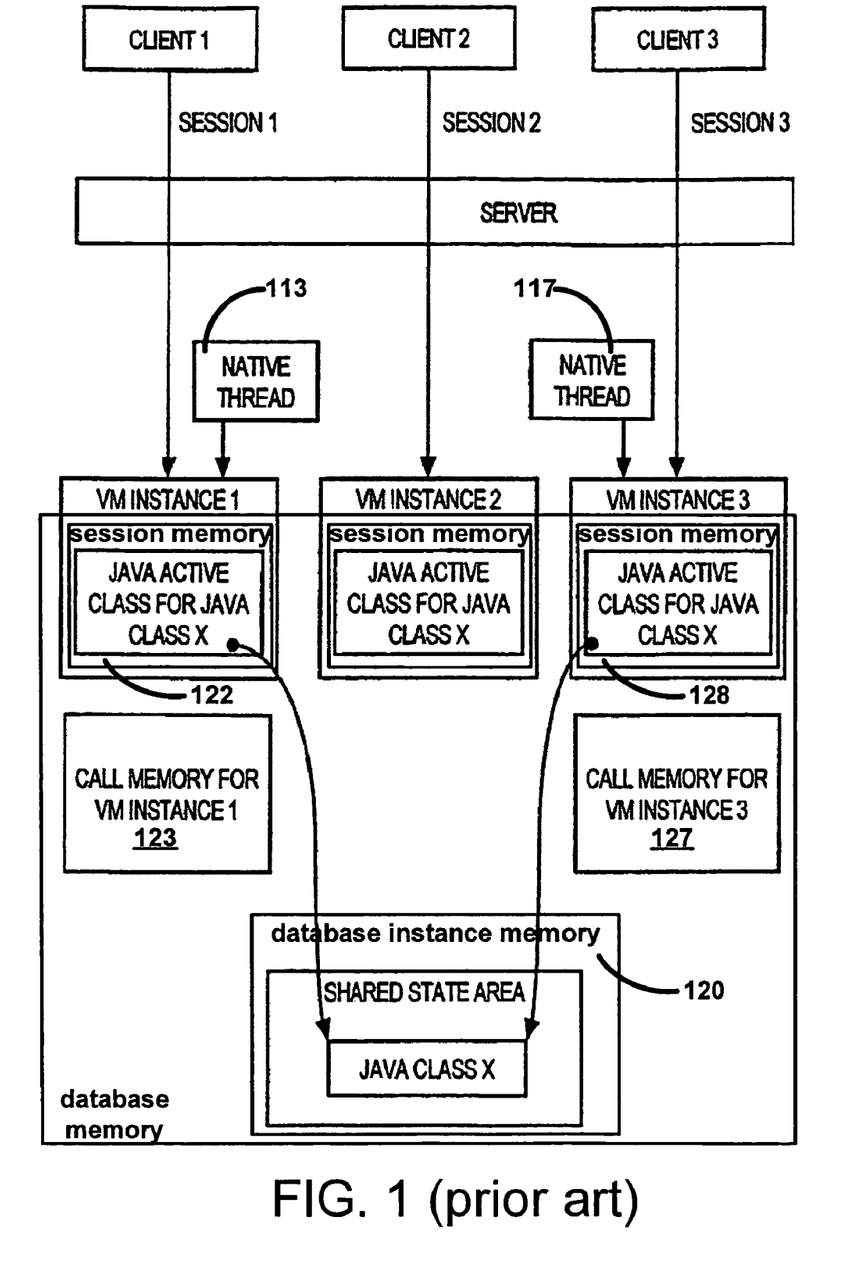
FIG. 1 illustrates, in a block diagram, a memory management system of the prior art.

To the inventors' knowledge, each instantiation of a Java application of prior art JIT systems runs in one process, and each process has it's own copy of any native machine code which has been compiled on demand, during the course of that VM instance. The above-described VM instances may be implemented by database server processes, such as processes 113 and 117 (FIG. 1). This figure is further described in US Patent Application 2001/0047436 and in U.S. Pat. No. 6,829,761 both by Harlan Sexton et al. and both of which are incorporated by reference herein in its entirety, as background. Sexton describes several different kinds of memories, including a database instance memory 120 which may be used to store read-only data and instructions that are executed by server processes 113 and 117.

See also U.S. Pat. No. 6,854,114 granted to Harlan Sexton et al, which is also incorporated by reference herein in its entirety, as background. In this patent, Sexton describes multiple VM instances accessing the shared state area illustrated at the bottom of FIG. 1. Three clients shown at the top of FIG. 1 have established three sessions through a server. A session is typically, although not necessarily, bounded by the time a single client connects to the server. When a client causes a program in the form of Java code to run within a session, it is termed as a call. A call can be started in different ways, e.g. as follows: (a) a SQL client program runs a Java stored procedure, (b) a trigger runs a Java stored procedure, and (c) a PL/SQL program calls a Java code. Typically, after a client establishes a session, a call begins and the program (which may be some combination of Java, SQL, or PL/SQL code) is run to completion, and then the call ends. Hence, each client performs the following: (a) connects to the database and opens a session, (b) runs the program within the database (and this is referred to as a call), (c) continues to work within the session, performing as many calls as required, and (d) ends the session.

Within a session of the type shown in FIG. 1 and described above, each client has its own Java environment. Oracle Corporation's relational database management system makes it appear to any given client as if a separate, individual JVM was started for that client's individual session. Within each session, Oracle transparently executes a shared JVM that manages the scalability of applications. Every call from a single client is managed within its own session, and a call from each client is handled separately. Oracle's shared JVM maximizes sharing of read-only data between clients while minimizing the per-session incremental footprint for each client. Variables defined as static by a program are local to each client even if the same program is executed by the shared JVM. No client can access the static variables of other clients, because any given session's memory is not accessible to any other session. Because each client runs Java application calls within its own session, the activities of each client are separate from and independent of any other client. The entire state of each Java program is private and exists for the entirety of a session. During a call, a client can store objects in static fields of different classes, which are available in the next session.

Referring to FIG. 1, in session 1, a call that involves services provided by the virtual machine is currently being processed by a system thread using VM instance 1. In session 3, a call that involves services provided by the virtual machine is currently being processed by a system thread using VM instance 3. Both VM instance 1 and VM instance 3 share access to the shared state area, which in the illustrated embodiment includes data for Java class X. In session 2, no call is currently active. To the inventors' knowledge, prior art systems create multiple VM instances within the server and run them in either separate processes, or using system threads, which typically cause a given program that is required by each VM instance to be redundantly and independently compiled by each VM instance, thereby wasting computational power. Moreover, to the inventors' knowledge, such prior art systems also maintain multiple copies of a program's executable code redundantly in memory, one copy maintained by each session independently of any other session, which wastes memory. Although creating and storing multiple copies of a program's compiled native code is simpler, this method does not scale well.

SUMMARY

In accordance with the invention, a computer is programmed with an application (e.g. a relational database management system) in which multiple sessions (e.g. Java sessions) automatically update a common counter (shared among the multiple sessions) on a metric related to a method that is executed by the application. For example, a first counter is incremented each time interpreted execution of a first method begins in any session, and a second counter is similarly incremented when interpreted execution of a second method begins in any session. In this example, system-wide statistics are collected in each counter, identifying the number of times its corresponding method has been interpreted by the system as a whole (regardless of session). The counter (of a given method) is commonly accessed for updating, by multiple sessions (e.g. by one Java interpreter per session) which are executing the given method by interpretation. Hence, the computer maintains a common counter for each interpreted method, regardless of session boundaries.

Also in accordance with the invention, the computer is programmed to compile a given method asynchronously (e.g. regardless of the state of the multiple sessions in the application which are using the given method). The asynchronous compilation generates compiled software in the form of native executable code (i.e. machine instructions) for the given method. Specifically, compilation starts (either eventually or immediately) after a given method's common (i.e. multi-session) counter satisfies a predetermined condition (e.g. exceeds a maximum limit on the number of executions of the given method).

When compilation of the given method completes, the compiled software resulting therefrom is stored in a shared memory of the application, which shared memory is accessible by all sessions interpreting the given method. In due course, each session finds out that compilation is completed, and the next time the given method needs to be run in that session, the given method is not interpreted and instead the compiled software is executed (e.g. executed directly from the shared memory). Hence, code compiled in several embodiments of the invention is shared (concurrently and/or sequentially) by two or more sessions, thereby resulting in its reuse. Such reuse is in contrast to the discard of compiled code which occurs in certain prior art systems when a session terminates execution.

DETAILED DESCRIPTION

In several embodiments of the invention, multiple sessions 211 and 212 in a database system 200 (FIG. 2) update a common counter 241 that is shared among sessions 211, 212 when beginning to execute a given method 251 in an interpreted manner. Use of a common counter (also called multi-session counter) by multiple sessions ensures that statistics about interpreted execution of method 251 are collected across multiple sessions 211, 212. Note that there is a one-to-one correspondence (shown by braces in FIG. 2) between counter 241 and its respective method 251 (identified as "method A" in FIG. 2), so that an additional method 252 (identified as "method B" in FIG. 2) has its own counter 242 that is updated by whichever multiple sessions are executing the additional method 252.

Figure 2:
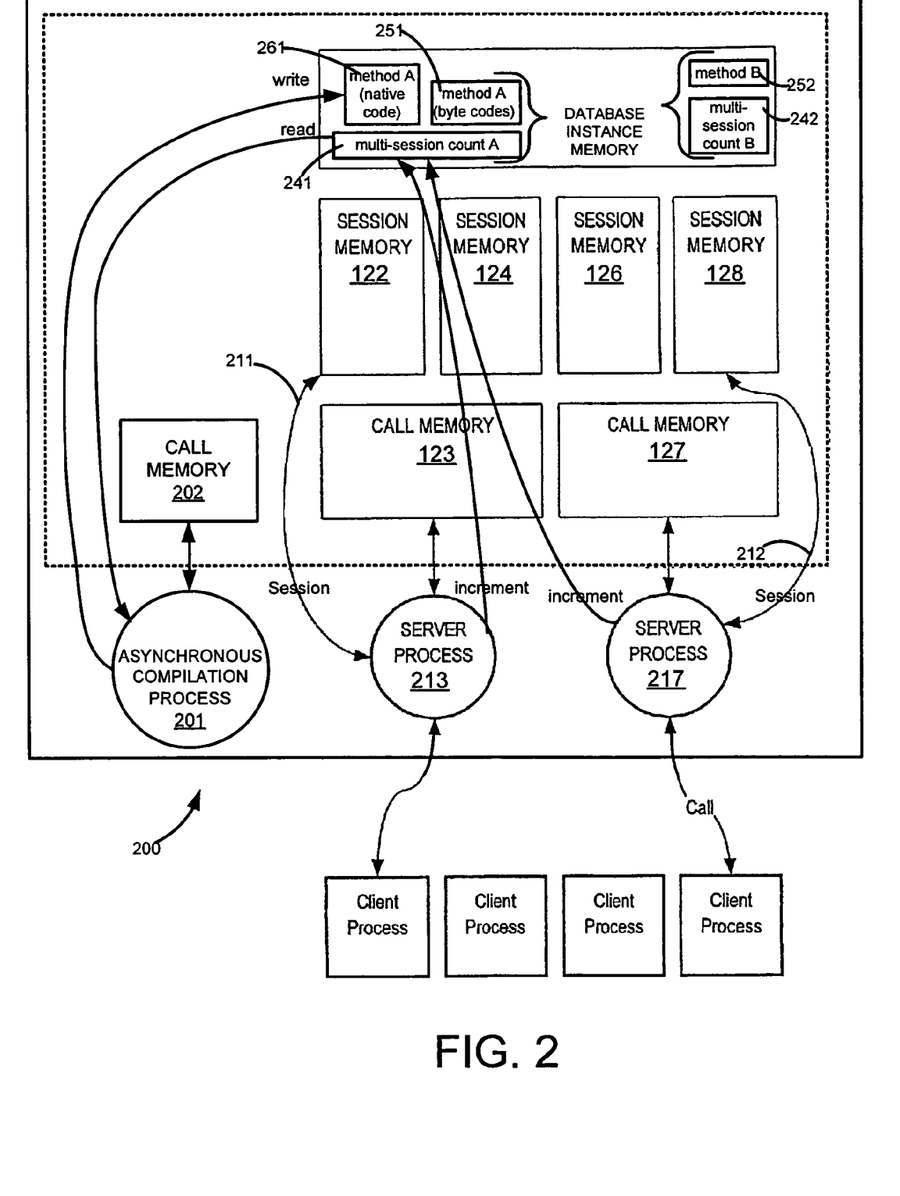
FIG. 2 illustrates, in a high-level block diagram, session memories 122, 124, 126 and 128 (one per session), and a shared memory 220 of a database instance in accordance with the invention.

Counters 241 and 242 are called multi-session counters because they are updated by multiple sessions, in contrast to counters that are specific to each individual session. Counters 241 and 242 are maintained in a shared memory 220 of the database instance so that they are accessible by any session therein. In several embodiments, multiple sessions 211 and 212 which execute method 251 are the only sessions in the entire database system 200, and hence the common multi-session counter 241 represents a system-wide statistic. Such shared collection of statistics and other such profiling data of each method by multiple sessions allows embodiments of the type described herein to identify as targets for compilation those methods which are bottlenecks in the database system as a whole, e.g. methods that have the highest usage in an entire database instance, instead of prioritizing for compilation those methods which are heavily used on just a per-session basis.

As an example, say there are four sessions in a database instance (e.g. as shown by the respective session-specific memories 122,124,126 and 128 in FIG. 2), and three of them are running application A, and one of them is running application B. The database instance as a whole performs better if those methods of application A which are the most heavily used are compiled first (by a single process 201 which does compilation work for all sessions), as opposed to if time were spent compiling methods of application B. Specifically, even when two methods of respective applications A and B are equally used on a per-session basis, each unit of work spent compiling the methods of application A benefits three sessions, whereas the same unit of work for compiling a method in application B only benefits one session.

Multi-session counter 241 (FIG. 2) is made accessible in accordance with the invention, for incrementing by respective interpreters in multiple sessions 211, 212 which interpret method 251 in respective server processes 213 and 217. Processes 213 and 217 are similar in some respects to prior art processes 113 and 117 of FIG. 1, but differ in certain respects as described herein, e.g. processes 213 and 217 update multi-session counters 241 and 242 and share compiled software of respective methods 251 and 252. Note that some embodiments do not implement locking on the multi-session counters 241, 242 so that occasionally there may arise an inaccuracy in maintaining a count of usage of a given method, e.g. if two sessions 211 and 212 increment counter 241 simultaneously or concurrently (e.g. session 211 may start updating counter 241 before session 212 finishes updating), the counter 241 may get incremented only once although to be accurate it should have been incremented twice.

The just-described embodiments which update their multi-session counters without locking are effective even if incrementing of the counters is less than accurate because such incrementing is still at least approximately accurate. This is because a predetermined condition, which triggers asynchronous compilation, is eventually met (albeit a little later). Hence, even though such lock-less incrementing is less than accurate, it is still effective. Eliminating the use of locks on multi-session counters 241, 242 enables these counters to be incremented quickly without requiring one session to wait while another is incrementing. Locking of multi-session counters to update them can adversely impact performance (e.g. increase latency).

The above-described computer is further programmed in many embodiments of the invention, to use a process 201 (FIG. 2) to asynchronously compile a method 251 (regardless of the state of the multiple sessions), to obtain compiled software 261 in the form of native executable code, i.e. machine instructions. Specifically, asynchronous compilation of a method's bytecodes by process 201 starts dynamically, whenever the multi-session counter corresponding to that method satisfies a predetermined condition (e.g. becomes greater than a preset number, such as 20,000). Note that in several embodiments, process 201 does its compilation work for multiple sessions 211, 212 which do not perform their own individual compilations.

Hence, sessions 211 and 212 of many embodiments are not blocked when a compilation is being done of a method 251 executed by these sessions. Instead these sessions 211 and 212 continue to execute method 251 (even if it is getting compiled) in interpreted manner. At some time after the compilation of this method 251 has completed, these sessions 211 and 212 eventually switch to executing native code 261 that results from the compilation of method 251 by process 201. If native code 261 (in the form of machine instructions resulting from compilation) doesn't exist in memory 220 (e.g. if it was not yet compiled or if it was compiled but discarded due to updates), then sessions 211 and 212 revert back to interpreted execution of method 251.

When compilation is completed for any method 251, the resulting native code 261 (i.e. machine instructions) are stored in a memory 220 of the database instance that is shared by each session 211, 212 supported by the database. Note that memory 220 is similar or identical to a prior art database instance memory 120 described above except for the differences that are noted herein. As noted above, a session is currently performing interpreted execution of method 251, then it continues to do so until the next time this method 251 needs to be run, at which time it is not interpreted, and instead a corresponding native code 261 is directly executed.

Instead of running an individual and private compilation in each session, many embodiments of the invention perform asynchronous compilation which provides the following benefits: increases system throughput, amortizes compile-time across all of the sessions in the instance, decreases memory usage by sharing the compiled native code among multiple sessions, decreases memory usage by only having one instance of the compiler itself running, and avoids complicated concurrency issues with respect to consuming and producing native executable code that is shared by multiple sessions. Regarding the last-described issue, note that in several embodiments of the type described above, there is a single writer (e.g. process 201) and multiple readers (e.g. sessions 211, 212 etc). Use of a single writer in such embodiments avoids a coherency problem inherent in use of multiple writers which arises if each session were to individually compile a method and store the compiled code in shared memory for access by other sessions.

In some embodiments of the invention, process 201 which performs compilation for multiple sessions is a database process which is in many respects similar to server processes 113 and 117. In one such embodiment, process 201 executes a compiler that is itself written in Java, and so the JIT compiler runs on top of the Java VM. Accordingly, in such embodiments, when any method's bytecodes need to be compiled, as determined by process 201, kernel is invoked to request a new database call and when the compilation is completed, process 201 informs the kernel that it is done with the database call. Specifically, in one embodiment, process 201 requests creation of a call context similar to the request for call context creation issued by a database listener in response to a SQL query from a user.

Figure 3:
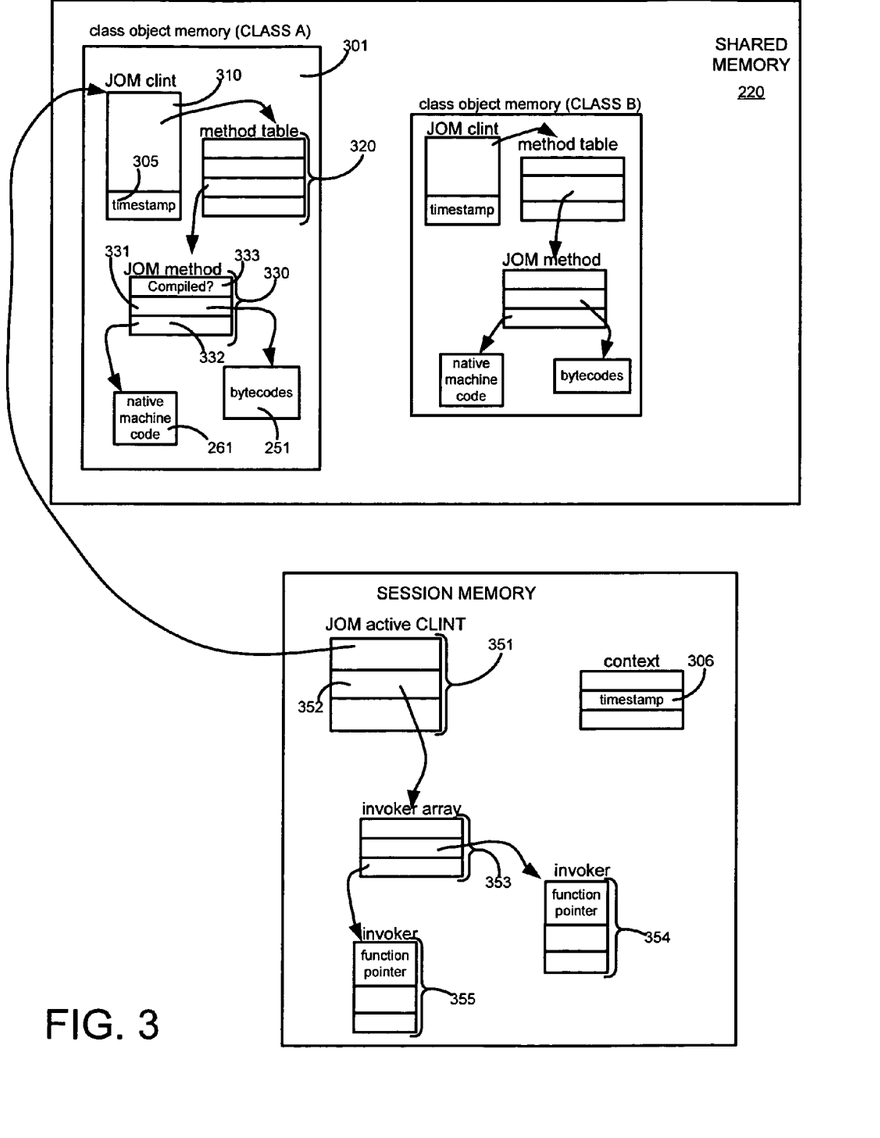
FIG. 3 illustrates, in a detailed block diagram, data structures used in some embodiments with the shared memory 220 and the session memories 122, 124, 126 and 128 of FIG. 2.

Hence, when process 201 is performing compilation it uses call memory 302 in the database system 200 in a manner similar or identical to use of call memories 123 and 127 by respective server processes 113 and 117. Note that to the database system itself, a session and a call started by process 201 for performing compilation appear like any other session (and call), except that process 201 writes executable code 242 into shared memory 220 (e.g. of a database instance).

Also, in several embodiments, an interpreter being executed in processes 113 and 117 maintains counts 241 and 242 in shared memory 220 as described above, instead of (or in some embodiments in addition to) session-private counts. In some embodiments, whenever a method is invoked, the method's counter in database instance memory 220 is incremented, and whenever there is a backward branch in the method and if there is a loop then on every iteration that method's associated counter is further incremented (and these incrementations are done without regard to session boundaries).

Furthermore, in many embodiments of the invention, the interpreter is able to transfer control to and receive control from native code, such as code 242. Note that transfer of control between natively compiled code and interpreted code is a standard feature, e.g. as described in U.S. Pat. No. 7,032,216 granted to Dmitry Nizhegorodov, which patent is hereby incorporated by reference herein in its entirety. In this patent, Nizhegorodov states the interpreter supports an execution model that mixes byte-interpreted and natively compiled classes. Thus, routines in translated code may call routines that are interpreted, and interpreted routines may call translated code routines, thereby providing call interoperability. In a similar manner, when a method has been compiled by compilation process 201 (FIG. 3) of the type described above, and when native code 242 is ready for execution, the interpreter knows how to arrange the stack frame to jump into that method and start using it and also how to accept being jumped back to when the compiled code finishes execution.

In some embodiments, two fields are maintained and used for each class in the shared memory, to implement the installation and use of compiled code 242 as illustrated in FIG. 3 and described next. In FIG. 3, shared memory 220 holds data (called "class object memory") 301 which describes an interpreted Java method. Specifically, in one illustrative embodiment, shared memory 300 (such as SGA memory in an Oracle database) is divided into smaller heaps, one heap per class object memory to hold all the data structures that are related to this class. Note that any other data structure such as a stack or queue can be used instead of a heap as described herein. One data structure in the class object memory 301 is called java object metadata class/interface or "JOM clint" 310 which is a top-level data structure, and there is exactly one JOM clint 310 for each class object memory—and its function is to represent the root of the Java class.

As illustrated in FIG. 3, JOM clint 310 for each class object memory 301 contains a pointer to a super class, and another pointer to various string representations of the class name (not shown in FIG. 3). JOM clint 310 also points to a method table 320 which in turn is an array of pointers to JOM methods, such as JOM method 330. JOM method 330 is an example of a method which is interpreted until its multi-session counter exceeds a preset limit at which time it is compiled. In the illustrative embodiment, JOM method 330 contains a name, argument types, and return types, among other such data, and depending on the method, it has a pointer 331 to byte codes 251, or a pointer 332 to native machine code 261.

Note that several data structures of the type shown in FIG. 3 are built in one specific illustrative embodiment using a list format—wherein each data structure has a header word which describes the information being carried in the data structure, how the information is formatted and what each field means, and which field of the data structure is a pointer etc. Such a header allows a recipient of a pointer to a memory area, to automatically figure out exactly what data is contained in which location of the memory area, and what needs to be done, for example if the data is to be printed out. Specifically, using a pointer as an input, such an embodiment looks up the first data word at the memory location addressed by the pointer to determine if the structure is a JOM method or a JOM clint.

In embodiments that dynamically compile a method 251, it is not known at class-load time (when the structures of FIG. 3 are built), as to whether the JOM method identified by structure 330 is to be interpreted or natively executed. Hence, structure 330 is initially built assuming that the JOM method is an interpreted method, and flag 333 is initialized to FALSE to indicate that the method is to be interpreted and pointer 331 is initialized to a memory address at which the to-be-interpreted instructions (i.e. byte codes 251) are located Note that pointer 332 is initialized to null at class-load time.

When process 201 (FIG. 2) decides to compile CLASS A, it goes to the method table 320 (FIG. 3) to find the JOM method data structure 330 and looks up pointer 331 to find the bytecodes to be compiled. And when the compilation is completed, process 201 places the native machine code in shared memory 220 e.g. in area 261 (FIG. 2) and updates pointer 332 (FIG. 3) and then changes flag 333 to TRUE. Note that flag 333 is checked each time CLASS A method needs to be executed (e.g. as per act 471 in FIG. 4C) and hence the next time this method is to be run, pointer 332 is used to access and execute compiled code 261.

Note that although pointer 331 points to bytecodes 251 of CLASS A, these are in shared memory 220 and hence the interpreter initially uses them from shared memory rather than maintaining and using a session-private copy of these bytecodes, with one exception as follows. In some embodiments, a session-private copy of bytecodes is kept in call memory 123 (FIG. 2) and used by the interpreter when the size of the bytecodes is too large to fit into a single page, in systems that have a paged memory architecture. A paged memory architecture is described in, for example, U.S. application Ser. No. 11/698,638 which has been incorporated by reference above.

Referring to FIG. 3, within a session private memory 350, there is a data structure 351 which is used to drive execution called JOM active CLINT (which is an abbreviation for "java object metadata for an active class/interface"), and there is one such structure 351 for each Java class that is actively being used by a session. JOM active CLINT structure 351 holds session-private properties, such as variables and a pointer 352 to an invoker array 353. Array 353 holds pointers to different types of invoker structures 354 and 355. The invoker structures 354 and 355 hold meta data and a function pointer to native executable code in shared memory. The invokers are specific to each method being dispatched and they are filled lazily—when a method is first known to have machine code. So although the first time this method is natively executed, it is necessary to set up the information, all subsequent executions of this method simply require a series of memory de-references (based on the invoker array and the invoker).

In some embodiments of the type described herein, each interpreter maintains for each method a counter (in session-private memory; not shown in FIG. 3) that is automatically incremented every time that method is invoked or a backward branch in that method is taken, similar to the above-described multi-session counter 241. The just-described session-private counter is used for certain tasks unrelated to performing compilation on bytecodes of the method. For example, when the session-private counter of a method passes a predetermined maximum limit (e.g. 20,000) then the interpreter resets the session-private counter and at the same time checks a global variable maintained by the database kernel, to find out whether or not there are any database interrupts which are pending, to be taken. This mechanism, called "polling" is also used in some embodiments to check if newly compiled code has been placed into shared memory by the asynchronous compilation process 201, as discussed next.

Specifically, two time stamps are maintained as illustrated in FIG. 3, namely a first time stamp 305 is maintained in the shared memory 220 in the JOM clint structure, which indicates when was the last time that a method of CLASS A was compiled. Time stamp 305 is also referred to herein as a "class" time stamp. A second time stamp 306 is maintained in session-private memory, in a data structure called "context" which indicates when was the last time this session obtained any compiled code (for any method). Time stamp 306 is also referred to as a "master" time stamp. If class time stamp 305 is newer than master time stamp 306 this condition indicates there is new (previously uncompiled) code now present in the shared memory that should be used, and therefore the pointers in the invoker array are reset. On being reset, the invokers revert back to being stubs, e.g. stub for CLASS A eventually filled lazily in future as described above, i.e. when a given method of CLASS A is known to have native machine code.

Figure 4A:
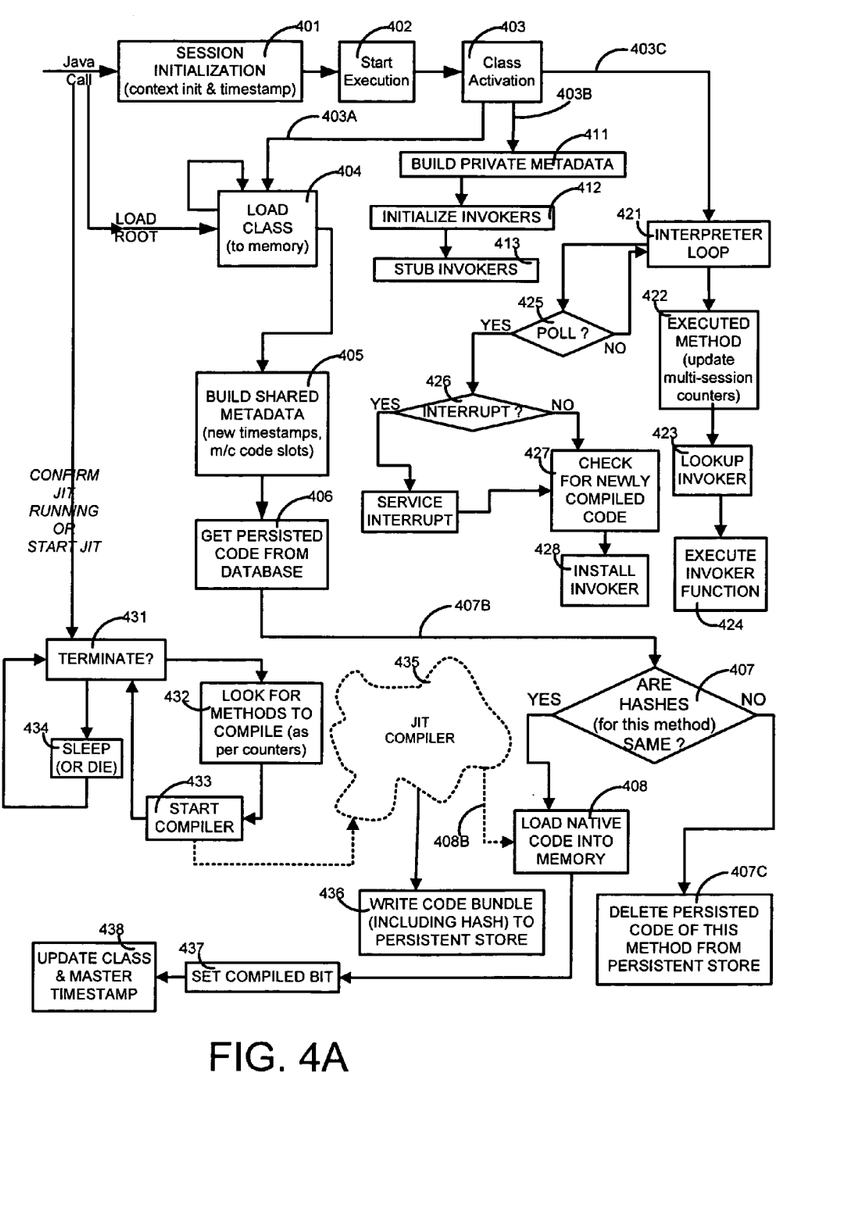
FIG. 4A illustrates, in a flow chart, a method that is executed in certain embodiments to perform asynchronous compilation, load compiled code into shared memory, and use the compiled code when available instead of interpreted execution.

Specifically, in act 401 shown in FIG. 4A a Java session context is initialized, e.g. various data structures such as the above-described time-stamp is initialized for the session. Next, in act 402, execution starts and every time that a class is used for the first time in the session, it is activated as per act 403. When a class is activated, the computer takes branch 403A and checks if the class is already loaded, as per act 404. If the class is not loaded then the computer does load call backs for it, wherein the computer builds the in-memory format for it which is the build shared meta data (as per act 405).

When the computer loads the metadata for a class, it loads all the information that is shared in the class object memory, and part of this information is the method structure, and if there is persisted native code for a given method in the database the computer retrieves that native code from the database (as per act 406). After retrieval of the native code from the database, that native code is loaded into memory (as per act 408) as described in further detail in FIG. 4C. After performance of act 407, the native code for the method is either successfully loaded in shared memory or rejected, and then the computer returns to act 405 which is performed for every method in the given class that is being loaded. So, acts 406 and 407 can be done multiple times, depending on the number of methods in the given class (so the computer goes through each method to load its native code if that method's native code was persisted).

After loading of a given class is completed in act 404, that class is activated in act 403 (the computer's return to act 403 occurs because the function call is completed by a return to the calling function). After the given class is activated, the computer takes branch 403B and builds private metadata for that class as per act 411. As a part of building the private metadata, the computer initializes the invokers (as per act 412) and installs stub invokers (as per act 413). Note that at this stage the invokers are merely "stubs" because they invoke the interpreter to interpret bytecodes of the corresponding method. After act 403 is completed for all the classes that need to be activated, then as per branch 403C an interpreter loop is started as per act 421.

The interpreter loop in act 421 executes methods for the current session, as per act 422. As noted above, a multi-session counter as well as a session-private counter for each method are both incremented, at an appropriate time (e.g. on beginning execution and/or when a backward branch is taken). Each time the computer begins executing a method, it initially interprets byte codes for that method. If the computer needs to execute another method, it looks up the invoker (as per act 423), and then executes the invoker function (as per act 424). As noted above, when the interpreter is executing, it polls. When polling, the computer checks for database interrupt conditions (as per act 426) and also checks if there is newly compiled code (as per act 427). If there is newly compiled code available, then the computer installs an invoker to use the newly compiled code (as per act 428). On completion of execution of the invoker function, the computer returns to executing any other methods in the current call and if no other methods remain, then the call ends.

During an actual compilation process (via JIT), when the computer initially starts a call, the computer makes a quick check to see if the JIT process is already running (this embodiment uses only one JIT process per database instance). The JIT process could already be running or alternatively the computer could be executing the very first session in a database instance in which case the JIT process is not already running and if so the first session spawns the JIT process. In the context of the JIT process, there is a loop as per act 431. This loop looks for methods to compile as per act 432. If there are methods to be compiled, then the compiler is started as per act 433 and the compiler then compiles the methods.

When the compiler is finished, the JIT returns to the loop 431 which then goes to sleep as per act 434. So the computer awakens every so often and if there is no code to be compiled it goes back to sleep but alternatively if there is code to be compiled it returns to act 432 which looks for the methods to be compiled based on the counters. In the act 432, after a method has been compiled by JIT compiler 435, the computer performs act 437 wherein the compiled bit is set, followed by updating time stamps 305 and 306, which in turn is followed by returning to the JIT compiler 485. JIT compiler 485 then loads the native code into memory as per act 408 (via branch 408B). Between the above-described acts 432 and 437, some embodiments of the computer stores the native code resulting from compilation into a persistent store (such as a database) as shown by act 436. Note that act 436 is optional, i.e. persistence is not critical aspect of certain embodiments of the invention. In some embodiments, a code bundle containing the native code and other information (e.g. information to transfer control across page boundaries) is emitted (written to persistent store) in act 436.

Figure 4B:
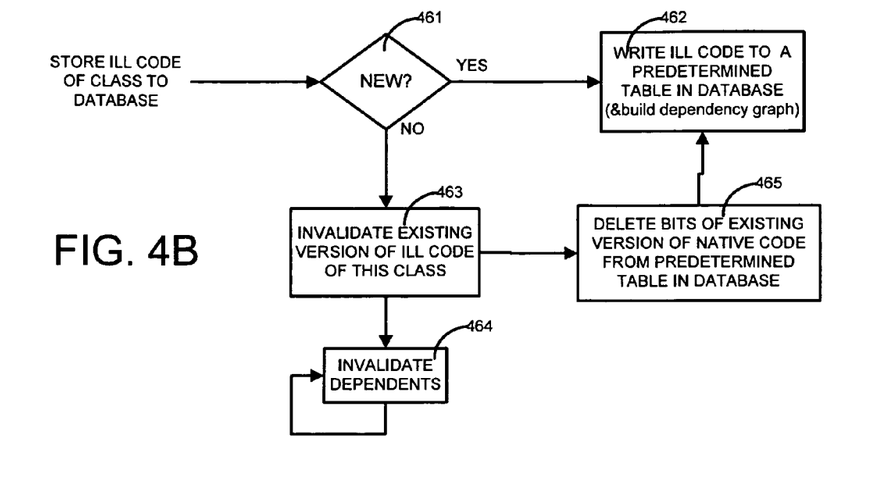
FIG. 4B illustrates, in a flow chart, acts performed in some embodiments to load a Java class into a database.

FIG. 4B illustrates how a class is loaded into the database. When loading a class, the computer first checks if the class is new (as per act 461) and if so the computer writes the bits of this class into a predetermined table in the database (in act 462) and also builds a dependency graph. If the class being loaded is not new, then the computer invalidates an old version of this class as per act 463 and invalidates all of the dependents as per act 464 (based on the dependency graph which should also pre-exist). Then the computer returns to act 463 and goes to act 465 to delete the bits of the old version of this class from the persistent store, e.g. the predetermined table in the database. Then the computer goes to act 462 to write the new version of this class.

Figure 4C:
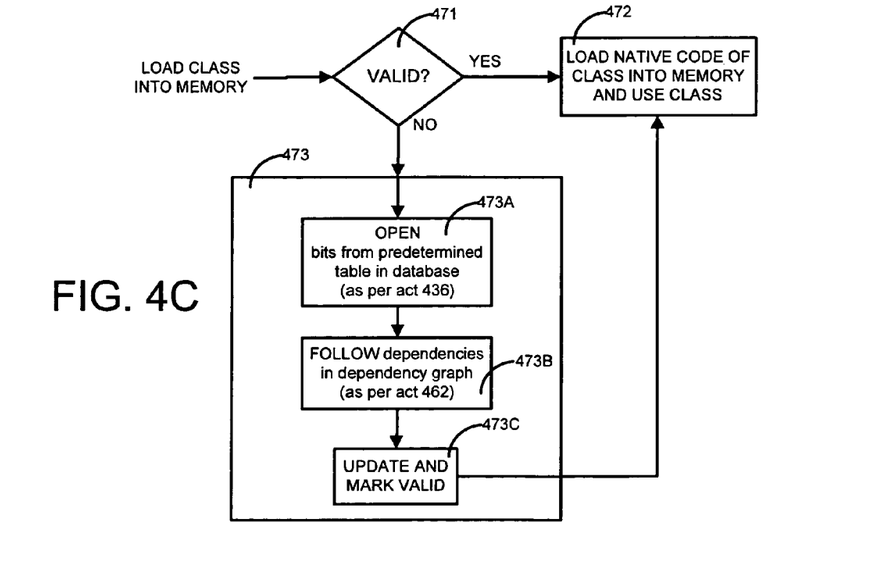
FIG. 4C illustrates, in a flow chart, acts performed in some embodiments to use a Java class which is stored in the database by the method shown in FIG. 4B.

FIG. 4C illustrates how the native executable code of a class from the database is used (see act 408) by the invoker. Specifically, the computer first checks if the class is marked valid in the database (as per act 471) and if so then the computer simply loads the native executable code of the class into memory from the database and uses the class, for example by executing a method therein (as per act 472). If the class is marked not valid in the database, then the computer resolves the class as per act 473. Specifically, in act 473, the computer fetches bits of this class from the database (as per act 473A), follows any dependents in the dependency graph (as per act 473B), and updates the dependents and marks them valid (as per act 473C) and then proceeds to act 472 (described above).

Figure 5:
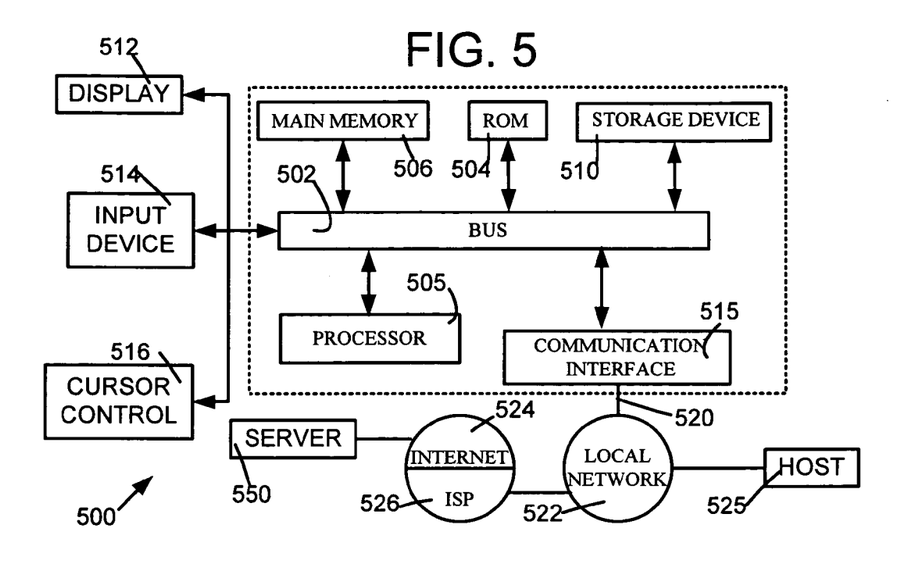
FIG. 5 illustrates, in a high level block diagram, hardware included in a computer that may be used to hold data structures of the type shown in FIG. 3 and to perform the methods of FIGS. 4A-4C in some embodiments of the invention.

Note that database system 200 may be implemented in some embodiments by use of a computer (e.g. an IBM PC) or workstation (e.g. Sun Ultra 20) that is programmed with a database application, such as the database program "Oracle 10gR1" available from Oracle Corporation of Redwood Shores, Calif. Such a computer can be implemented by use of hardware that forms a computer system 500 as illustrated in FIG. 5. Specifically, computer system 500 includes a bus 502 (FIG. 5) or other communication mechanism for communicating information, and a processor 505 coupled with bus 502 for processing information.

Computer system 500 also includes a main memory 506, such as a random access memory (RAM) or other dynamic storage device, coupled to bus 502 for storing information and instructions to be executed by processor 505. Main memory 506 also may be used for storing temporary variables or other intermediate information during execution of instructions to be executed by processor 505. Computer system 500 further includes a read only memory (ROM) 504 or other static storage device coupled to bus 502 for storing static information and instructions for processor 505. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 505. Another type of user input device is cursor control 516, such as a mouse, a trackball, or cursor direction keys for communicating direction information and command selections to processor 505 and for controlling cursor movement on display 512. This input device typically has two degrees of freedom in two axes, a first axis (e.g., x) and a second axis (e.g., y), that allows the device to specify positions in a plane.

As described elsewhere herein, incrementing of multi-session counters, shared compilation for multiple sessions, and execution of compiled code from shared memory are performed by computer system 500 in response to processor 505 executing instructions programmed to perform the above-described acts and contained in main memory 506. Such instructions may be read into main memory 506 from another computer-readable medium, such as storage device 510. Execution of instructions contained in main memory 506 causes processor 505 to perform the process steps described herein. In alternative embodiments, hard-wired circuitry may be used in place of or in combination with software instructions to implement an embodiment of the type illustrated in FIGS. 3 and 4A-4C. Thus, embodiments of the invention are not limited to any specific combination of hardware circuitry and software.

The term "computer-readable medium" as used herein refers to any non-transitory medium that participates in providing instructions to processor 505 for execution. Such a non-transitory medium may take many forms, including but not limited to, non-volatile media, and volatile media. Non-volatile media includes, for example, optical or magnetic disks, such as storage device 510. Volatile media includes dynamic memory, such as main memory 506.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, as described hereinafter, or any other non-transitory medium from which a computer can read.

Various forms of computer readable media may be involved in carrying the above-described instructions to processor 505 to implement an embodiment of the type illustrated in FIGS. 3 and 4A-4C. For example, such instructions may initially be carried on a magnetic disk of a remote computer. The remote computer can load such instructions into its dynamic memory and send the instructions over a telephone line using a modem. A modem local to computer system 500 can receive such instructions on the telephone line and use an infra-red transmitter to convert the received instructions to an infra-red signal. An infra-red detector can receive the instructions carried in the infra-red signal and appropriate circuitry can place the instructions on bus 502. Bus 502 carries the instructions to main memory 506, in which processor 505 executes the instructions contained therein. The instructions held in main memory 506 may optionally be stored on storage device 510 either before or after execution by processor 505.

Computer system 500 also includes a communication interface 515 coupled to bus 502. Communication interface 515 provides a two-way data communication coupling to a network link 520 that is connected to a local network 522. Local network 522 may interconnect multiple computers (as described above). For example, communication interface 515 may be an integrated services digital network (ISDN) card or a modem to provide a data communication connection to a corresponding type of telephone line. As another example, communication interface 515 may be a local area network (LAN) card to provide a data communication connection to a compatible LAN. Wireless links may also be implemented by communication interface 515. In any such implementation, communication interface 515 sends and receives electrical, electromagnetic or optical signals that carry digital data streams representing various types of information.

Network link 520 typically provides data communication through one or more networks to other data devices. For example, network link 520 may provide a connection through local network 522 to a host computer or to data equipment operated by an Internet Service Provider (ISP) 526. ISP 526 in turn provides data communication services through the world wide packet data communication network 524 now commonly referred to as the "Internet". Local network 522 and network 524 both use electrical, electromagnetic or optical signals that carry digital data streams. The signals through the various networks and the signals on network link 520 and through communication interface 515, which carry the digital data to and from computer system 500, are exemplary forms of carrier waves transporting the information.

Computer system 500 can send messages and receive data, including program code, through the network(s), network link 520 and communication interface 515. In the Internet example, a server 530 might transmit a code bundle through Internet 528, ISP 526, local network 522 and communication interface 515. In accordance with the invention, one such downloaded set of instructions implements an embodiment of the type illustrated in FIGS. 3 and 4A-4C. The received set of instructions may be executed by processor 505 as received, and/or stored in storage device 510, or other non-volatile storage for later execution.

Numerous modifications and adaptations of the embodiments described herein will be apparent to the skilled artisan in view of the disclosure.

Accordingly numerous such modifications and adaptations are encompassed by the attached claims.

What is claimed is:

1. A computer-implemented method of creating machine instructions, the method comprising:

each session in a plurality of sessions updating a multi-session counter in response to an interpreter executing within said each session, a given method comprising a plurality of to-be-interpreted instructions;

wherein the multi-session counter is updated by multiple sessions concurrently or simultaneously without locking, wherein in the event that one session starts updating the multi-session counter before another session finishes updating the multi-session counter, the multi-session counter becomes inaccurate relative to a number of interpretations of the given method in the plurality of sessions;

a common process for the plurality of sessions compiling the given method to obtain compiled software, in response to the multi-session counter exceeding a preset limit, regardless of whether the multi-session counter has become inaccurate; and after completion of the compiling, said each session executing the compiled software from a shared memory accessible to the plurality of sessions.

2. The computer-implemented method of claim 1 wherein: the compiling is performed in a just-in-time manner in response to the predetermined condition being met.

3. The computer-implemented method of claim 1 wherein each session uses a private memory comprising:

a flag indicating presence or absence of the compiled software; and a pointer initialized to the compiled software in the shared memory when the flag indicates presence.

4. A non-transitory computer-readable storage medium comprising a plurality of instructions, the plurality of instructions comprising:

instructions to each session in a plurality of sessions to update a multi-session counter in response to an interpreter executing within said each session, a given method comprising a plurality of to-be-interpreted instructions;

wherein on execution of the instructions, the multi-session counter is updated by multiple sessions concurrently or simultaneously without locking, wherein in the event that one session starts updating the multi-session counter before another session finishes updating the multi-session counter, the multi-session counter becomes inaccurate relative to a number of interpretations of the given method in the plurality of sessions;

instructions to a common process compiling the given method to obtain compiled software, in response to the multi-session counter exceeding a preset limit, regardless of whether the multi-session counter has become inaccurate; and instructions to said each session to execute the compiled software from a shared memory accessible to the plurality of sessions, after completion of compiling by the common process.

5. An apparatus for creating and executing machine instructions, the apparatus comprising:

means for each session in a plurality of sessions for updating a multi-session counter in response to an interpreter executing a predetermined software within said each session;

wherein the multi-session counter is updated by the means of multiple sessions concurrently or simultaneously without locking, wherein in the event that the means of one session starts updating the multi-session counter before the means of another session finishes updating the multi-session counter, the multi-session counter becomes inaccurate relative to a number of interpretations of the predetermined software in the plurality of sessions;

means for a common process for compiling the predetermined software to obtain compiled software comprising machine instructions, in response to the multi-session counter exceeding a preset limit, regardless of whether the multi-session counter has become inaccurate; and means for said each session for executing the compiled software from a shared memory accessible to the plurality of sessions, after completion of compiling by the common process.

6. The computer-implemented method of claim 1 wherein:
the plurality of to-be-interpreted instructions comprises a loop.

7. The computer-implemented method of claim 6 wherein:
the multi-session counter is incremented on every iteration through the loop, without regard to session boundaries.

8. The computer-implemented method of claim 1 wherein:
the given method has a name, multiple argument types and multiple return types.

9. The computer-implemented method of claim 1 wherein:
the compiled software is comprised in a code bundle; and
the code bundle comprises information to transfer control across page boundaries.

10. The non-transitory computer-readable storage medium of claim 4 wherein:
the plurality of to-be-interpreted instructions comprises a loop.

11. The non-transitory computer-readable storage medium of claim 10 wherein:
the multi-session counter is incremented, during execution of said plurality of to-be-interpreted instructions, on every iteration through the loop, without regard to session boundaries.

12. The non-transitory computer-readable storage medium of claim 4 wherein:
the given method has a name, multiple argument types and multiple return types.

13. The non-transitory computer-readable storage medium of claim 4 wherein:
the compiled software is comprised in a code bundle; and
the code bundle comprises information to transfer control across page boundaries.

14. The non-transitory computer-readable storage medium of claim 4 further comprising:
instructions to each session to use a private memory comprising a flag indicating presence or absence of the compiled software and a pointer initialized to the compiled software in the shared memory when the flag indicates presence.

15. The non-transitory computer-readable storage medium of claim 4 wherein:
the instructions to the common process are to perform the compiling in a just-in-time manner in response to the predetermined condition being met.

16. The apparatus of claim 5 wherein:
the means for compiling uses the common process to perform the compiling in a just-in-time manner in response to the predetermined condition being met.

17. The apparatus of claim 5 wherein:
the compiled software is comprised in a code bundle; and
the code bundle comprises information to transfer control across page boundaries.

18. The apparatus of claim 5 wherein each session uses a private memory comprising:
a flag indicating presence or absence of the compiled software; and
a pointer initialized to the compiled software in the shared memory when said flag indicates presence.

19. The apparatus of claim 5 wherein:
the predetermined software comprises a loop; and
the multi-session counter is incremented on every iteration through the loop, without regard to session boundaries.

20. The apparatus of claim 6 wherein:
the predetermined software has a name, multiple argument types and multiple return types.

* * * * *

UNITED STATES PATENT AND TRADEMARK OFFICE
CERTIFICATE OF CORRECTION

PATENT NO. : 8,413,125 B2  Page 1 of 1
APPLICATION NO. : 11/698629
DATED : April 2, 2013
INVENTOR(S) : Lee et al.

It is certified that error appears in the above-identified patent and that said Letters Patent is hereby corrected as shown below:

In the Specifications

In column 11, line 18-19, delete "cartridge," and insert -- cartridge --, therefor.

In the Claims

In column 14, line 45, in Claim 20, delete "claim 6" and insert -- claim 5 --, therefor.

Signed and Sealed this
Ninth Day of July, 2013

Teresa Stanek Rea
*Acting Director of the United States Patent and Trademark Office*